Nov. 7, 1950     A. OBERHOLTZ ET AL     2,528,774
CIRCULATING ELECTRIC HEATER
Filed June 3, 1947
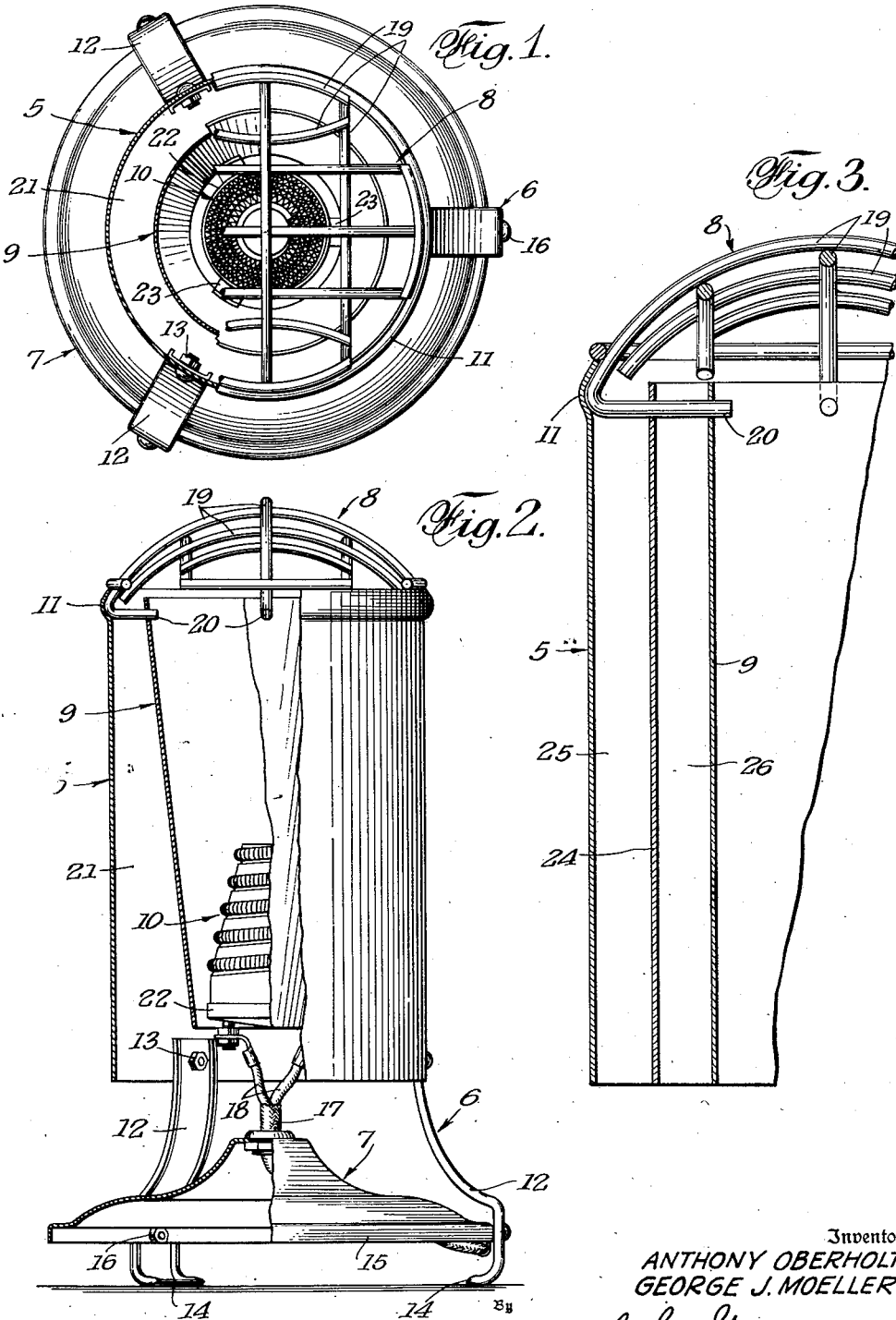
Inventors
ANTHONY OBERHOLTZ
GEORGE J. MOELLER
C. G. Stratton
           Attorney Patented Nov. 7, 1950

2,528,774

UNITED STATES PATENT OFFICE 2,528,774

CIRCULATING ELECTRIC HEATER

Anthony Oberholtz, Los Angeles, and George J. Moeller, Altadena, Calif.; said Moeller assignor to said Oberholtz Application June 3, 1947, Serial No. 752,012

10 Claims. (Cl. 219—38)

This invention relates to electric heaters embodying heat reflector means and air circulating means in a compact and efficient unit.

An object of the present invention is to provide a heater of the character indicated which is constructed so that the heat thereof is not conducted to the support base whereby the heater can be safely handled and does not present a hazard to children.

Another object of the invention is to provide a heater, as indicated, in which the heating element is suspended from the top of a housing tube and the base is connected to the bottom of said tube whereby heat conduction to said base is minimized.

Another object of the invention is to provide a heater of the character indicated in which one or more concentric tubes are arranged within the housing tube thereof to obviate direct transmission of heat to the latter and to interpose at least one annular air passage between the heating element and said housing tube for effective cooling of the latter.

A further object of the invention is to provide a heater embodying a novel grill structure, readily assembled on the housing tube and serving to support inner tubes and the heating element from the top.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a top plan view, partly in cross-section of a preferred form of heater embodying features of the present invention.

Fig. 2 is a partial elevational partial sectional view thereof.

Fig. 3 is an enlarged partial vertical sectional view of an alternate form of structure, the heating element and base of which is omitted since they are similar to the counter parts shown in Figs. 1 and 2.

The heater which is shown in Figs. 1 and 2 comprises, generally, an outer housing tube 5, support means 6 for said tube, a base 7 connected to said means 6 beneath said tube, a grill 8 over the top of said tube, an inner tube 9 carried by said grill, and a heating element 10 carried by the latter tube.

The housing tube 5 is shown as of circular cross-section and at its upper end is formed with an annular seat 11 for snap-retention of the grill 8.

The support means 6 comprises preferably three legs 12, each having a channel cross-section so they may be light yet rigid. Each leg is secured by a bolt 13 to the bottom inner face of tube 5 and extends outwardly and downwardly to terminate in an inwardly curved foot 14 which engages a supporting surface.

The base 7 is shown as a spun plate having a peripheral flange 15 for engagement by legs 12 and for securement thereto by bolts 16. The plate 7 has a central opening for an electric cable 17 passing from the under side of said plate, through said opening, and terminating in conductors 18 adapted to be connected to heating element 10. In the above manner, the tube 5 is mounted in spaced relation to the base 7 so that air can readily circulate upwardly through the bottom of said tube.

The grill 8 is formed by a plurality of interconnected and crossed wires or rods 19 and formed to be outwardly or convexly domed. As shown, four ends 20 of said wires are inwardly directed on a common plane to engage and suspend the inner tube 9. No matter how otherwise formed, the outer end portions of some of said wires or rods are curved so that they may be snapped into position in seat 11 of the tube 5, whereby the grill is effectively assembled in place and yet removable, if desired.

The tube 9 is concentrically positioned in tube 5 to provide an annular passage 21. As shown, said tube is outwardly tapered from the bottom up and in its upper end is provided with suitable openings for the wire ends 20 which, thus, suspend tube 9 from the top.

The heating element 10 is generally conventional and is preferably centrally disposed in the lower end of tube 9 and supported by a band 22 connected by radial spacers 23 to said tube. The heater receives electric current through conductors 18 and, by radiation of the heat thus produced from the preferably polished inner surface of tube 9, transmits said heat in an upward direction past the grill 8. Such heat as may pass through the wall of tube 9 is dissipated by an upward circulation of air in passage 21. Thus the housing tube 5 is kept from being heated and, consequently, the base 7 is kept cool.

The modification of Fig. 3, as hereinbefore stated, is constructed similarly to the form of Figs. 1 and 2. However, additional means are provided for preventing conduction of heat to outer housing tube 5. As shown, said means comprises an additional tube 24 disposed between and concentrically with tubes 5 and 9 so that two annular passages 25 and 26 are provided for air circulation between said tubes 5 and 9. The wire ends 20, in this case, are made somewhat longer so that they may suspend both tubes 9 and 24 from the top.

Since the only direct conduction of heat to the base 7 can be through legs 12 and since said legs are connected to the bottom of the relatively cool outer tube 5, little or no heat passes to said base, which remains cool. Any exposed portion of the heater, except the grill 8, can be grasped or touched with complete comfort.

While we have illustrated and described what we now regard as the preferred embodiments of our invention, the construction is, of course, subject to modifications without departing from the spirit and scope of our invention. We, therefore, do not wish to restrict ourselves to the particular forms of construction illustrated and described, but desire to avail ourselves of all modifications that may fall within the scope of the appended claims.

Having thus described our invention, what we claim and desire to secure by Letters Patent is:

1. A heater comprising an imperforate outer housing tube, an imperforate inner tube within the housing tube centrally thereof and outwardly and upwardly flared to form an annular chamber between the tubes, at least three legs connected to the housing tube to support the heater, a transversely disposed base plate connected to intermediate portions of the legs to provide a substantially uninterrupted space in direct communication with said annular chamber for conduction of air therethrough to cool the housing tube, a grill over the housing tube and having portions connected to and suspending the inner tube, and a heating element carried by the inner tube in and adjacent the bottom thereof.

2. In a heater of the character described, an outer cylindrical housing tube, an inner tube therewithin and spaced to provide an annular air flow passage between the tubes, said inner tube being outwardly flared toward the top and extending from above the bottom and short of the top of the housing tube, and an air-passing grill mounted on the outer tube and connected to and suspending the inner tube, said grill comprising inter-connected and crossed wires some of which are formed with inwardly directed ends having the mentioned suspending engagement with the inner tube.

3. In a heater of the character described, an outer housing tube having an annular seat formed in the upper end thereof, an air passing grill formed of inter-connected crossed wires having snap-retention engagement in said seat, some of said wires having inwardly directed ends, and at least one tube concentric with the housing tube having mounting connection with said wire ends.

4. In a heater of the character described, an outer housing tube having an annular seat formed in the upper end thereof, an air passing grill formed of inter-connected crossed wires having snap-retention engagement in said seat, some of said wires having inwardly directed ends, an upwardly flared inner tube concentrically arranged in the housing tube and having its upper wider end connected with said wire ends, a heating element carried in and by the lower end of the inner tube, and means spacing the lower end of the housing tube from a support for the heater.

5. In a heater of the character described, an upright, open-ended imperforate housing member, means to support the housing member above the floor, an inner, upright, open-ended and imperforate reflective member spaced within the housing member, the inner member flaring upwardly and outwardly to aid in reflecting heat upwardly, said members defining a continuous annular space therebetween to conduct heat away from the housing member, a heating element supported by and within the inner member, the heating element being disposed adjacent the lower portion of the inner member, and connecting means suspending the inner member from the housing member substantially at the top of the inner member and supporting the inner member above the floor.

6. A heater comprising an outer cylindrical housing tube having an annular seat formed in the upper end thereof, an air-passing grill formed of inter-connected crossed wires formed to have a domed shape, the ends of some of the wires being inwardly bent to form inwardly directed ends, the wires at the bends having snap-retention engagement in said annular seat, an upwardly and outwardly flared inner tube suspended from said inwardly directed ends substantially concentrically within the housing tube, and a heater element within the lower portion of the inner tube.

7. A heater comprising an outer cylindrical housing tube having an annular seat formed in the upper end thereof, an air-passing grill formed of inter-connected crossed wires formed to have a domed shape, the ends of some of the wires being inwardly bent to form inwardly directed ends, the wires at the bends having snap-retention engagement in said annular seat, an upwardly and outwardly flared inner tube suspended from said inwardly directed ends substantially concentrically within the housing tube, a heater element within the lower portion of the inner tube, and means interconnecting the heater element and the lower end of inner tube whereby the latter supports the former.

8. A heater comprising a substantially cylindrical outer housing, an inner tube spaced within the housing to provide an annular chamber between the tube and the housing, the tube being outwardly and upwardly flaring, the housing and tube being of heat-conducting material, means suspending the tube from the housing at the upper portion of the tube, and a heating element supported by the lower portion of the tube in heat conducting connection with the housing only through the tube and said suspending and supporting means.

9. A heater comprising a substantially cylindrical outer housing, an inner tube spaced within the housing to provide an annular chamber between the tube and the housing, the tube being outwardly and upwardly flaring, the housing and tube being of heat-conducting material, means supporting the tube from the housing, a heating element, and means offset from the tube-supporting means supporting the heating element from the tube in heat conducting connection with the housing only through the tube and through said supporting means.

10. A heater comprising a substantially cylindrical outer housing, a base element supporting the housing, an inner tube spaced within the housing to provide an annular chamber between the tube and the housing, the tube extending approximately as high as the top of the housing and flaring outwardly in an upward direction, means supporting the tube from the housing, a heating element substantially below the supporting means and substantially below the top of the tube, and means supporting the heating element within and directly from the tube and apart from any direct connection with the base or the outer housing.

ANTHONY OBERHOLTZ.
GEORGE J. MOELLER.

REFERENCES CITED

The following references are of record in the file of this patent:

UNITED STATES PATENTS

| Number | Name | Date |
|---|---|---|
| 1,712,204 | Gibney | May 7, 1929 |
| 1,724,198 | Hauser | Aug. 13, 1929 |
| 1,827,788 | Hicks | Oct. 20, 1931 |
| 2,091,867 | Martin | Aug. 31, 1937 |
| 2,208,130 | Jaroll | July 16, 1940 |